US009830791B2

(12) United States Patent
Trivelpiece et al.

(10) Patent No.: US 9,830,791 B2
(45) Date of Patent: Nov. 28, 2017

(54) SELF-DETACHABLE RFID TAGS

(71) Applicants: Steve E. Trivelpiece, Rancho Santa Margarita, CA (US); Alister Hosseini, Long Beach, CA (US); Craig E. Trivelpiece, Mission Viejo, CA (US)

(72) Inventors: Steve E. Trivelpiece, Rancho Santa Margarita, CA (US); Alister Hosseini, Long Beach, CA (US); Craig E. Trivelpiece, Mission Viejo, CA (US)

(73) Assignee: Tyco Fire & Security GmbH, Neuhausen AM Rheinfall (CH)

( * ) Notice: Subject to any disclaimer, the term of this patent is extended or adjusted under 35 U.S.C. 154(b) by 0 days.

(21) Appl. No.: 14/974,577

(22) Filed: Dec. 18, 2015

(65) Prior Publication Data

US 2016/0351034 A1    Dec. 1, 2016

Related U.S. Application Data

(60) Provisional application No. 62/167,169, filed on May 27, 2015.

(51) Int. Cl.
*G08B 13/24* (2006.01)
*E05B 73/00* (2006.01)
(Continued)

(52) U.S. Cl.
CPC ...... *G08B 13/2434* (2013.01); *E05B 73/0017* (2013.01); *E05B 73/0047* (2013.01);
(Continued)

(58) Field of Classification Search
CPC ............ G08B 13/2434; G08B 13/2402; G08B 13/242; E05B 73/0017; E05B 73/0047;
(Continued)

(56) References Cited

U.S. PATENT DOCUMENTS 5,942,978 A   8/1999 Shafer
5,945,920 A   8/1999 Maletsky
(Continued)

OTHER PUBLICATIONS

PCT International Search Report and Written Opinion of the International Searching Authority (EPO) for International Application No. PCT/US2016/034626 (dated Sep. 9, 2016).

*Primary Examiner* — Kerri McNally
*Assistant Examiner* — Thang Tran
(74) *Attorney, Agent, or Firm* — Fox Rothschild LLP; Robert J. Sacco; Carol E. Thorstad-Forsyth

(57) ABSTRACT

Systems and methods for operating an RFID tag. The methods comprise: inducing current through a magnetic loop or solenoid disposed within the RFID tag that is caused by a inductive field, a magnetic field or an RF field being generated within a surrounding environment; using the current which is induced through the magnetic loop or solenoid to charge a capacitor disposed within the RFID tag; decreasing the amount of current induced through the magnetic loop or solenoid; receiving a detaching signal at the RFID tag; electrically connecting the capacitor to a detaching unit disposed within the RFID tag in response to the detaching signal; and activating the detaching unit by supplying current from the capacitor to the detaching unit, whereby the RFID tag can be detached from an article.

18 Claims, 6 Drawing Sheets

(51) Int. Cl.
*G07G 3/00* (2006.01)
*G06K 19/07* (2006.01)
*G06K 19/077* (2006.01)

(52) U.S. Cl.
CPC ...... *E05B 73/0064* (2013.01); *G06K 19/0723* (2013.01); *G06K 19/07749* (2013.01); *G07G 3/003* (2013.01); *G08B 13/2402* (2013.01); *G08B 13/242* (2013.01)

(58) Field of Classification Search
CPC ............ E05B 73/0064; G06K 19/0723; G06K 19/07749; G07G 3/003
USPC .......................... 340/572.1–572.9, 10.1–10.6
See application file for complete search history.

(56) References Cited

U.S. PATENT DOCUMENTS

| | | | | |
|---|---|---|---|---|
| 6,072,383 A * | 6/2000 | Gallagher | .......... | G06K 7/10336 340/10.2 |
| 2002/0171550 A1 * | 11/2002 | Hirose | .................. | E05B 45/005 340/572.9 |
| 2005/0190060 A1 * | 9/2005 | Clancy | ................ | G08B 13/246 340/572.9 |
| 2007/0132581 A1 * | 6/2007 | Molyneaux | .......... | G01R 33/288 340/551 |
| 2008/0297349 A1 * | 12/2008 | Leone | ................ | G08B 13/2477 340/572.1 |
| 2009/0198529 A1 * | 8/2009 | Burkholder | .......... | G06Q 10/087 705/28 |
| 2009/0224918 A1 * | 9/2009 | Copeland | ............ | E05B 73/0017 340/572.1 |
| 2009/0322531 A1 | 12/2009 | Estevez | | |
| 2010/0097223 A1 | 4/2010 | Kruest | | |
| 2011/0012713 A1 * | 1/2011 | Wilkinson | ......... | G06K 7/10178 340/10.3 |
| 2011/0074582 A1 * | 3/2011 | Alexis | .................. | G08B 13/149 340/572.1 |
| 2012/0032803 A1 * | 2/2012 | Copeland | ........... | G08B 13/2431 340/572.1 |
| 2013/0009755 A1 * | 1/2013 | Hong | .................. | G06K 7/10118 340/10.33 |
| 2013/0255335 A1 * | 10/2013 | Jonely | ................. | E05B 47/0001 70/277 |
| 2014/0240129 A1 * | 8/2014 | Bergman | ........... | G08B 13/2434 340/572.9 |
| 2014/0253333 A1 * | 9/2014 | Patterson | ............ | E05B 73/0064 340/572.4 |
| 2015/0053773 A1 * | 2/2015 | Hsu | .................... | G06K 7/10356 235/492 |
| 2015/0254951 A1 * | 9/2015 | Colby | ................ | G08B 13/2417 340/572.8 |
| 2016/0260302 A1 * | 9/2016 | Ellers | ................ | G08B 13/2434 |

* cited by examiner

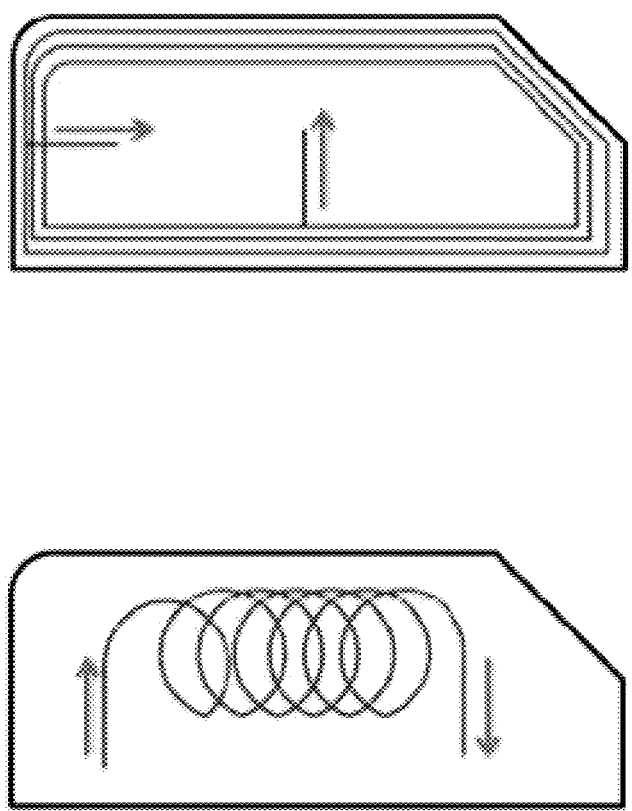

Go To FIG. 5B

SELF-DETACHABLE RFID TAGS

CROSS-REFERENCE TO RELATED APPLICATIONS

This application claims priority benefits of U.S. Provisional Patent Application No. 62/167,169 filed on May 27, 2015, the contents of which are herein incorporated by reference.

BACKGROUND OF THE INVENTION

Statement of the Technical Field

The present invention relates generally to Radio Frequency Identification ("RFID") tags or markers. More particularly, the present invention relates to self-detachable inductive-charged RFID tags or markers with an internal capacitor for enhanced read/visibility range.

Description of the Related Art

RFID tags are becoming more important in the tracking and visibility world. Everyday novel ideas are being investigated to improve the quality and the performance of such systems. Battery-assist RFID tags are known for their long detection/performance range. These tags are equipped with batteries with the following main practical issue: the batteries are required to be changed periodically which becomes very challenging in a setup with large numbers of tags or the tags are discarded.

Detaching/deactivating RFID tags is an important part of an RFID system. RFID tags are required to be detached or deactivated from the items being purchased for example. As an example, hard RFID tags (i.e., being made in a hard plastic housing) are attached mechanically to an item (e.g., a clothing item in a department store). After the item is purchased, a detacher equipped with a mechanical arm is used to remove the tag from the item. The self-checkout process is becoming a major trend in retail. Unfortunately, mechanical detaching of security tags is only performed by trained personnel and does not allow a full self-checkout process for the final customer. This could be a major threat for the security tag business as retailer may choose to remove the security tags.

SUMMARY OF THE INVENTION

The present disclosure concerns systems and methods for operating an RFID tag. The methods comprise: inducing current through a magnetic loop or solenoid disposed within the RFID tag that is caused by a inductive field, a magnetic field or a Radio Frequency ("RF") field being generated within a surrounding environment; using the current which is induced through the magnetic loop or solenoid to charge a capacitor disposed within the RFID tag; and decreasing the amount of current induced through the magnetic loop or solenoid. The amount of current induced through the magnetic loop or solenoid can be decreased by moving the RFID tag a certain distance away from a source of the inductive field, magnetic field or RF field.

Next, a detaching signal is received at the RFID tag. The detaching signal is generated by and communicated from a Point Of Sale ("POS") device or an RFID reader. In response to the detaching signal, the capacitor is electrically connected to a detaching unit disposed within the RFID tag. The capacitor may be electrically connected to the detaching unit by causing a switch to change position from a first position in which an antenna of the RFID tag is connected to the capacitor to a second position in which the capacitor is connected to the detaching unit. The capacitor then supplies current to the detaching unit. In turn, the detaching unit is activated or actuated where the RFID tag can be detached from an article. Notably, the capacitor provides enough energy to detach or deactivate the RFID tag when no external magnetic flux is present or when a relatively weak magnetic flux is present.

In some scenarios, the detaching unit comprises (a) an arm that moves into a housing of the RFID tag when the current is supplied to the detaching unit and out of the housing when the current is not being supplied to the detaching unit and/or (b) a lock which is released when the current is supplied to the detaching unit. The magnetic loop or solenoid is disposed within an internal cavity formed in the housing of the RFID tag or imbedded within housing walls of the RFID tag.

In those or other scenarios, the methods further comprise: receiving an RFID interrogation signal at the RFID tag; and communicating a response signal from the RFID tag in response to the RFID interrogation signal. The response signal includes, but is not limited to, a first identifier of the RFID tag and/or a second identifier for the article. The detaching signal is received subsequent to when an external device determines that: (1) the first identifier is valid for the RFID tag; (2) the article to which the RFID tag is attached has been accepted for a purchase transaction; or (3) the article to which the RFID tag is attached has been successfully purchased.

BRIEF DESCRIPTION OF THE DRAWINGS

Embodiments will be described with reference to the following drawing figures, in which like numerals represent like items throughout the figures, and in which:

FIG. 4(a) is a schematic illustration of an exemplary RFID tag comprising an internal solenoid or magnetic loop.

FIG. 4(b) is a schematic illustration of an exemplary RFID tag comprising an embedded magnetic loop.

DETAILED DESCRIPTION OF THE INVENTION

Figure 1:
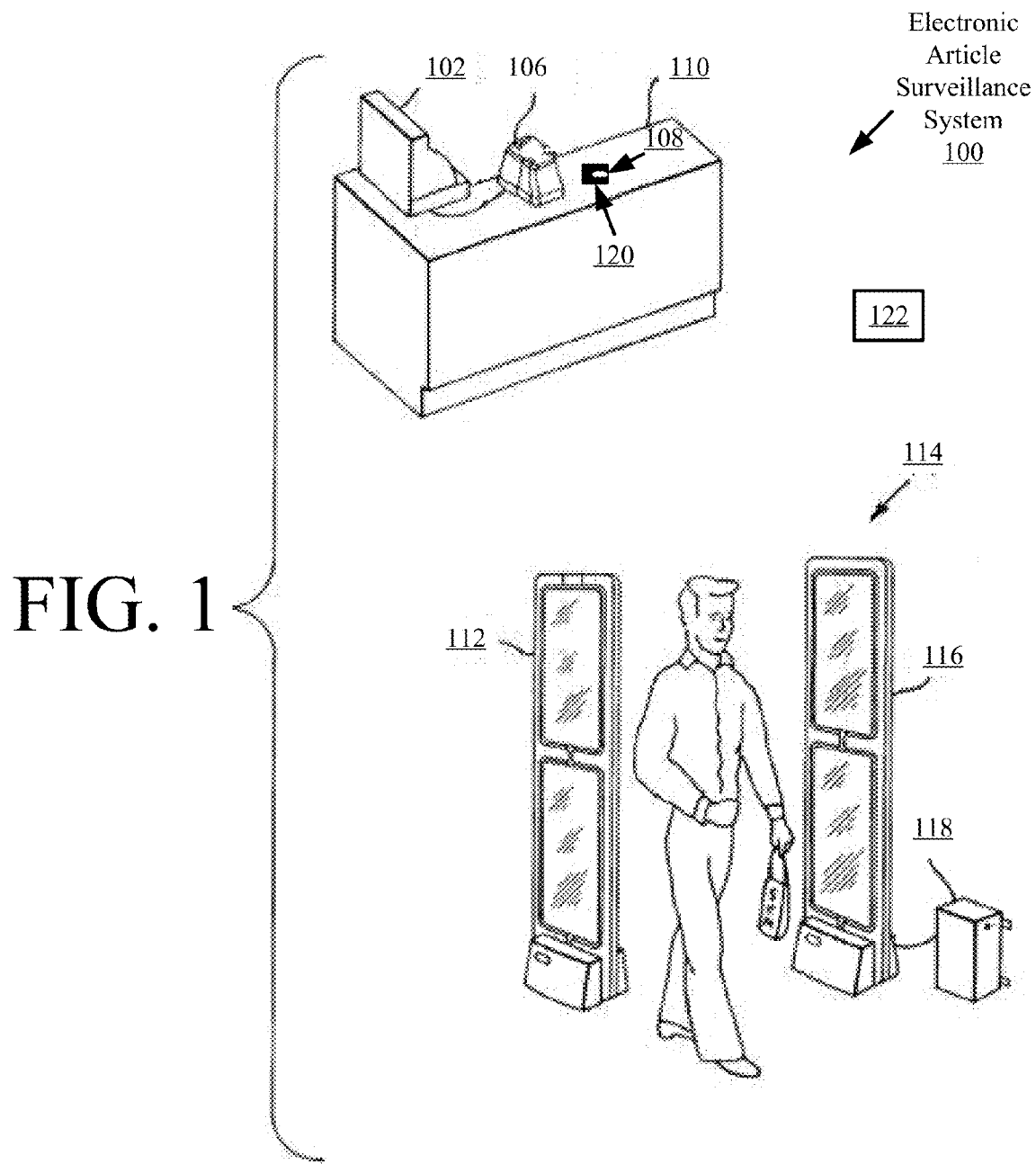
FIG. 1 is a schematic illustration of an exemplary architecture for an EAS system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure generally concerns RFID tags equipped with internal capacitors rather than internal batteries. The internal capacitors are large-enough to store energy received from either inductive fields or RF radiated fields. This forms temporary semi-passive/active tags having an effectiveness that remains therewith depending on a type of the power-usage application (i.e., to communicate, to self-detach, or to provide more energy to an RFID chip to improve its performance and other applications) and/or size of the internal capacitor. As technology advances, the line between a capacitor and a battery continues to blur. In some applications, rechargeable batteries can act very similar to capacitors. The use of the word capacitor herein is not intended to preclude the use of batteries with similar behavior.

The proposed solution allows RFID tags to be easily and safely detached by the final customer enabling self-checkout for secured items. In this regard, each RFID tag comprises a self-detaching RFID tag which uses extra power stored in an internal capacitor for detaching operations. The internal capacitor can be charged from induced current caused by magnetic flux through an internal solenoid/magnetic-loop or the RF power received through an RFID Ultra High Frequency ("UHF") antenna.

The RFID tags are controlled and tracked by RFID commands which are received through an RFID antenna. In addition, data is communicated by modulating the magnetic flux. In the RFID tags, an actuator (or a mechanical lock) inside the same gets the energy from an internal capacitor. However, each RFID tag will start the detaching process as soon as the related command is received through an RFID channel. The addition of an internal capacitor provides numerous advantages over the existing RFID tag systems. The inclusion of an internal capacitor improves the performance of RFID tags in various applications as will be discussed below.

The RFID tag discussed herein is equipped with a self-detaching block and an internal capacitor. In some scenarios, the self-detaching block is in a form of an arm that moves in and out or a mechanical lock which is released in response to a detaching command. The internal capacitor provides enough energy for short-term applications (e.g., communications or self-detaching). For example, in the self-detaching scenarios, the internal capacitor supplies power or energy to the self-detaching block. The internal capacitor is charged mainly from the induced current produced by an internal solenoid or magnetic loop in proximity of an external device producing magnetic flux. Additionally or alternatively, the internal capacitor is charged using UHF radiated power received from an RFID antenna.

An RFID detaching signal is received through the RFID antenna and controls an internal switch which relays or blocks an induced current to the self-detaching block. The self-detaching block serves to detach and/or deactivate the RFID tag. The induced current recharges the internal capacitor. The internal capacitor provides enough energy to detach and/or deactivate the RFID tag when no external magnetic flux is present or when a weak flux is present.

Also, the present solution can be used to form semi-passive/active tags with extended read/visibility range. In this case, the induced current is used to charge an embedded capacitor. The embedded capacitor releases enough power to increase the transmit power of the RFID tag.

Exemplary Implementing System

The present solution will be described below in relation to an Electronic Article Surveillance ("EAS") system employing RFID technology. The present solution is not limited in this regard. For example, the present solution can be employed in RF or RFID systems (e.g., inventory tracking systems, access control systems, etc.).

Referring now to FIG. 1, there is provided a schematic illustration of an exemplary EAS system 100 that is useful for understanding the present invention. EAS systems are well known in the art, and therefore will not be described in detail herein. Still, it should be understood that the present invention will be described herein in relation to an acousto-magnetic (or magnetostrictive) EAS system. Embodiments of the present invention are not limited in this regard. The EAS system 100 may alternatively include a magnetic EAS system, an RF EAS system, a microwave EAS system or other type of EAS system. In all cases, the EAS system 100 generally prevents the unauthorized removal of articles from a retail store.

In this regard, EAS security tags 108 are securely coupled to articles (e.g., clothing, toys, and other merchandise) offered for sale by the retail store. Exemplary embodiments of the EAS security tags 108 will be described below in relation to FIGS. 3-4B. At the exits of the retail store, detection equipment 114 sounds an alarm or otherwise alerts store employees when it senses an active EAS security tag 108 in proximity thereto. Such an alarm or alert provide notification to store employees of an attempt to remove an article from the retail store without proper authorization.

In some scenarios, the detection equipment 114 comprises antenna pedestals 112, 116 and an electronic unit 118. The antenna pedestals 112, 116 are configured to create a surveillance or interrogation zone at the exit or checkout lane of the retail store by transmitting an EAS interrogation signal. The EAS interrogation signal causes an active EAS security tag 108 to produce a detectable response if an attempt is made to remove the article from the retail store. For example, the EAS security tag 108 can cause perturbations in the interrogation signal, as will be described in detail below.

The antenna pedestals 112, 116 may also be configured to act as RFID readers. In these scenarios, the antenna pedestals 112, 116 transmit an RFID interrogation signal for purposes of obtaining RFID data from the active EAS security tag 108. The RFID data can include, but is not limited to, a unique identifier for the active EAS security tag 108. In other scenarios, these RFID functions are provided by devices separate and apart from the antenna pedestals.

The EAS security tag 108 can be deactivated and detached from the article 120 without the use of a conventional detaching unit 106. Typically, EAS security tags are removed or detached from the articles by store employees when the corresponding article has been purchased or has been otherwise authorized for removal from the retail store. In contrast, the EAS security tag 108 is a self-detaching security tag which can be detached from the article 120 by a store employee, customer or other individual. As such, the detaching unit 106 is no longer needed at a checkout counter 110 of the retail store or a self-checkout kiosk (not shown in FIG. 1). All that is needed is a POS terminal 102.

In general, the POS terminal 102 facilitates the purchase of articles from the retail store. POS terminals are well known in the art, and therefore will not be described herein. The POS terminal 102 can include any known or to be known POS terminal with or without any modifications thereto. For example, the POS terminal 102 can include an employee assisted checkout counter (shown in FIG. 1), a self-checkout kiosk (not shown in FIG. 1) or a Mobile Point Of Sale ("MPOS") checkout device (e.g., a software application running on a smart phone).

In some cases, the POS terminal 102 is configured to operate as an RFID reader. As such, the POS terminal 102 may transmit an RFID interrogation signal for purposes of obtaining RFID data from an EAS security tag 108. The RFID data can include, but is not limited to, the tag's unique identifier and/or an article's identifier. Upon receipt of the tag's unique identifier and/or an article's identifier, the POS terminal 102 determines: (1) whether the received identifier(s) is(are) valid for an EAS security tag of the retail store; (2) whether the article has been accepted for a purchase transaction; and/or (3) whether the article has been successfully purchased. If it is determined that the received identifier(s) is(are) valid for an EAS security tag of the retail store, the article has been accepted for a purchase transaction and/or the article has been successfully purchased, then the POS terminal 102 sends a detaching/deactivating signal to the EAS security tag 108. In response to the detaching/deactivating signal, a detaching unit of the EAS security tag 108 is deactivated and/or actuated so as to facilitate the detachment of the EAS security tag 108 from the article 120.

Notably, one or more Magnetic Flux Generating ("MFG") stations 122 are disposed within the retail store at strategic locations. The MFG stations 122 generate magnetic fields which charge an energy storage component (e.g., a capacitor) of the EAS security tag 108 when present therein. The energy storage device is then used to supply energy for (a) activating transmit/receive operations of the detaching unit of the EAS security tag 108 and/or (b) activating/actuating the detaching unit of the EAS security tag 108, as described below.

Figure 2:
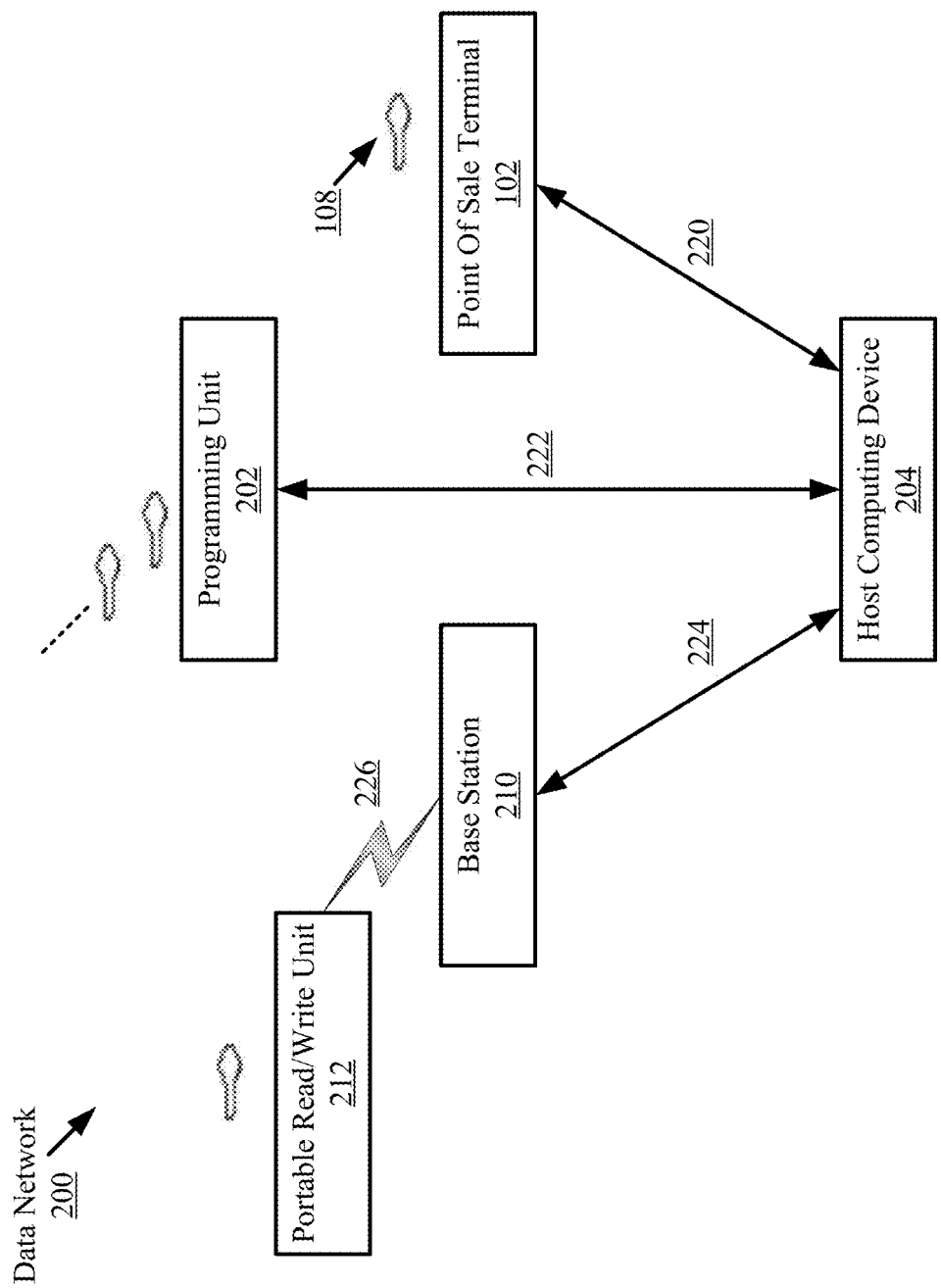
FIG. 2 is a schematic illustration of an exemplary architecture for a data network that is useful for understanding the present invention.

Referring now to FIG. 2, there is provided a schematic illustration of an exemplary architecture for a data network 200 in which the various components of the EAS system 100 are coupled together. Data network 200 comprises a host computing device 204 which stores data concerning at least one of merchandise identification, inventory, and pricing. A first data signal path 220 allows for two-way data communication between the host computing device 204 and the POS terminal 102. A second data signal path 222 permits data communication between the host computing device 204 and a programming unit 202. The programming unit 202 is generally configured to write product identifying data and other information into memory of the EAS security tag 108. A third data signal path 224 permits data communication between the host computing device 204 and a base station 210. The base station 210 is in wireless communication with a portable read/write unit 212. The portable read/write unit 212 reads data from the EAS security tags for purposes of determining the inventory of the retail store, as well as writes data to the EAS security tags. Data can be written to the EAS security tags when they are applied to articles of merchandise.

Figure 3:
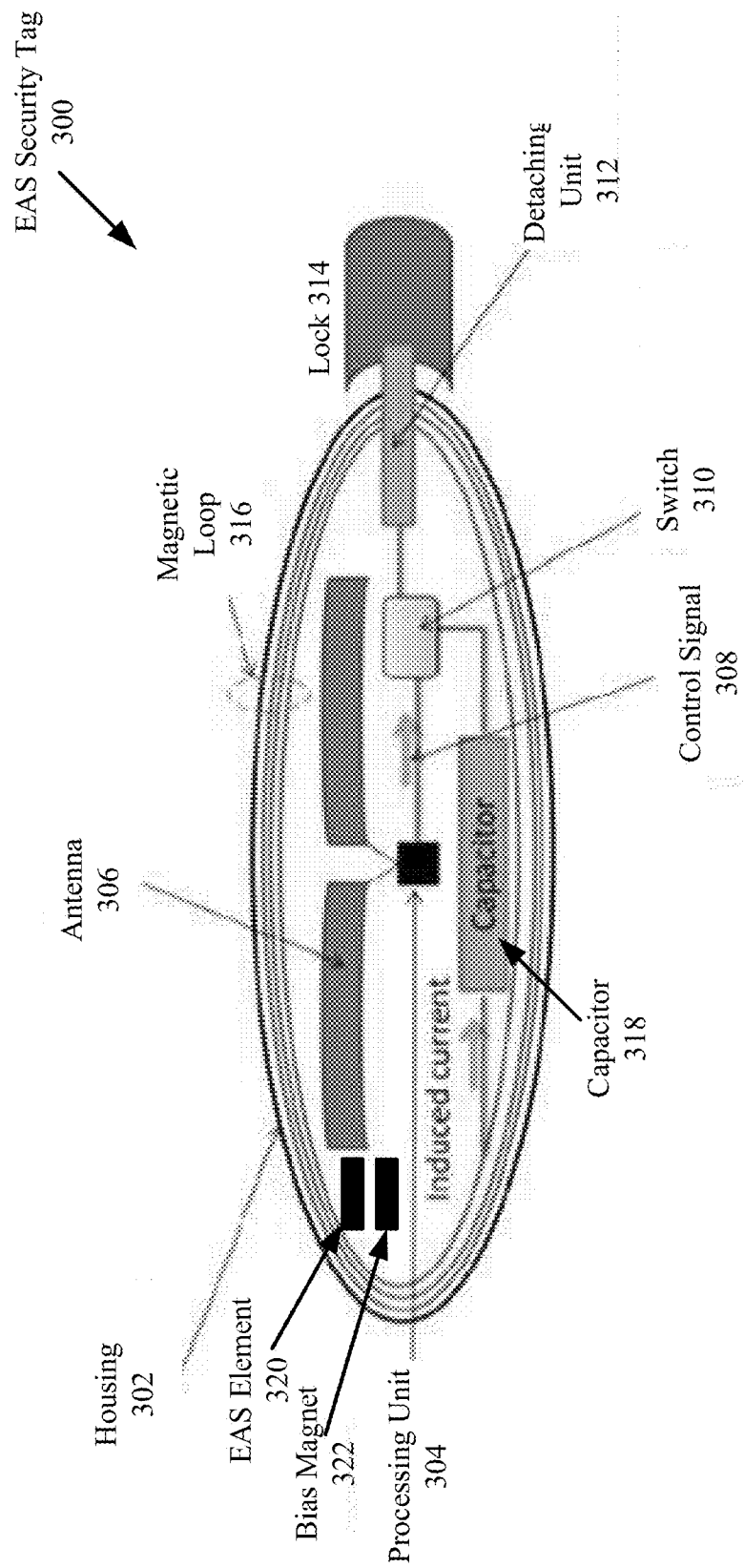
FIG. 3 is a schematic illustration of an exemplary RFID tag.

Referring now to FIG. 3, there is provided a cross sectional view of an exemplary architecture for an EAS security tag 300. EAS security tag 108 can be the same as or similar the EAS security tag 300. As such, the discussion of EAS security tag 300 is sufficient to understand EAS security tag 108 of FIGS. 1-2.

As shown in FIG. 3, EAS security tag 300 comprises a housing 302 which is at least partially hollow. The housing 302 can be formed from a rigid or semi-rigid material, such as plastic. A lock 314 is lockingly coupled to the housing 302. The lock 314 may include a mechanical locking mechanism and/or a magnetic locking mechanism.

A magnetostrictive active EAS element 320 and a bias magnet 322 are also disposed within the housing 302. These components 320, 322 may be the same as or similar to that disclosed in U.S. Pat. No. 4,510,489. In some scenarios, the resonant frequency of components 320, 322 is the same as the frequency at which the EAS system (e.g., EAS system 100 of FIG. 1) operates (e.g., 58 kHz). Additionally, the EAS element 320 is formed from thin, ribbon-shaped strips of substantially completely amorphous metal-metalloid alloy. The bias magnet 322 is formed from a rigid or semi-rigid ferromagnetic material. Embodiments are not limited to the particulars of these scenarios.

During operation, antenna pedestals (e.g., antenna pedestals 112, 116 of FIG. 1) of an EAS system (e.g., EAS system 100 of FIG. 1) emit periodic tonal bursts at a particular frequency (e.g., 58 kHz) that is the same as the resonance frequency of the amorphous strips (i.e., the EAS interrogation signal). This causes the strips to vibrate longitudinally by magnetostriction, and to continue to oscillate after the burst is over. The vibration causes a change in magnetism in the amorphous strips, which induces an AC voltage in an antenna structure 306. The antenna structure 306 converts the AC voltage into a radio wave. If the radio wave meets the required parameters (correct frequency, repetition, etc.), the alarm is activated.

In some cases, it is desirable to detach and/or deactivate the EAS security tag 300 prior to when the article (e.g., article 120 of FIG. 1) passes through an interrogation zone established between two pedestals (e.g., pedestals 112 and 116 of FIG. 1) of an EAS system (e.g., EAS system 100). The EAS security tag 300 may be detached/deactivated (A) when the article to which it is attached has been accepted for a purchase transaction and/or (B) when the article has been successfully purchased. (A) and (B) can be determined by an external device (e.g., POS terminal 102 of FIG. 1) based on information obtained from the EAS security tag 300. The information can include, but is not limited to, a unique identifier of the EAS security tag 300 and/or an identifier of the article (e.g., article 120 of FIG. 1) to which the EAS security tag 300 is attached. The information is then compared to information associated with a purchase transaction to determine if the EAS security tag 300 is attached to an article which has been accepted for a purchase transaction and/or has been successfully purchased.

Detachment of the EAS security tag 300 from the article is facilitated by a magnetic loop 316 (or solenoid) disposed in the housing 302 of the EAS security tag 300. In some scenarios, the magnetic loop 316 is placed as a small loop inside the housing 302, as shown in FIG. 3. The magnetic loop 316 has a significant loading impact on the antenna 306 degrading its performance. In other scenarios, the magnetic loop 316 is imbedded inside housing walls of the EAS security tag 300 as shown in FIG. 4B. There are many advantages of imbedding the magnetic loop inside the housing walls. For example, a relatively larger magnetic loop can be imbedded inside the housing walls. The relatively larger magnetic loop can be coupled more strongly to the main/outside loop (i.e., external magnetic flux) producing stronger induced current inside the EAS security tag 300. This is much desired for recharging the capacitor and/or directly activating an actuator to detach the EAS security tag 300 from an article. Additionally, the loading impact to the antenna 306 would be minimal since it won't block the main radiating surface of the antenna. The volume/size of the EAS security tag 300 can be reduced since the magnetic loop 316 is placed within the housing 302 of the EAS security tag 300 and not as an external item inside the housing 302.

The magnetic loop 316 is excited by an external magnetic flux $\Phi$ whereby an induced current is produced in the wires forming the magnetic loop 316. The external magnetic flux is produced by an external device (e.g., MFG station 122 or POS terminal 102 of FIG. 1) in proximity to the EAS security tag 300. The induced current is used to charge or recharge a capacitor 318 disposed inside the housing 302 of the EAS security tag 300. In this regard, the capacitor 318 is electrically connected to the magnetic loop 316, as shown in FIG. 3. The capacitor 318 may additionally or alternatively be charged using UHF radiated power received from antenna 306 and/or a magnetically coupled inductive loop (as shown in FIG. 4A). Once charged to a pre-specified level, the capacitor 318 is able to provide an amount of energy suitable for operating the processing unit 304 and/or detaching unit 312 when no external magnetic flux is present or when a relatively weak external magnetic flux is present.

A switch 310 is provided for controlling the supply of voltage/current from the capacitor 318 to the detaching unit 312. The switch 310 is controlled by an RFID command generated by and received from an external device (e.g., POS terminal 102 of FIG. 1). The RFID command is sent in a detaching/deactivating signal from the external device. The switch 310 is normally in a position which electrically connects the antenna 306 to the capacitor via the processing unit 304. When detachment/deactivation of the EAS security tag 300 is desired, the external device communicates the RFID command to the EAS security tag 300. In response to the RFID command, the processing unit 304 causes the switch 310 to change positions so that the capacitor 318 is electrically connected to the detaching unit 312. In effect, the capacitor 318 supplies energy to the detaching unit 312 for activating or actuating the same. In some scenarios, the detaching unit 312 includes, but is not limited to: (a) an arm that moves into the housing when voltage/current is supplied thereto and out of the housing when the voltage/current is not being supplied thereto; and/or (b) a lock which is released when voltage/current is supplied thereto.

As evident from the above discussion, the current induced in the magnetic loop 316 has two main purposes: (1) a direct use purpose; and (2) an indirect use purpose. With regard to the direct use purpose (1), the induced current is directly used to produce energy (in real-time) to control the switch 310 or to form an active RFID tag with extended visibility/read range. With regard to the indirect use purpose (2), the induced current is indirectly used to produce extra current for storage by the capacitor 318 which can be used temporarily when the EAS security tag 300 is a certain distance from the magnetic flux. As noted above, the capacitor 318 supplied voltage/current to the detaching unit 312 when a specific command is received through an RFID link and when the external magnetic flux is not available or is too weak.

The EAS security tag 300 can be placed on items located on magnetic-enabled racks (e.g., clothing racks) with large solenoids producing strong external magnetic flux or other structures generating the strong magnetic flux. Therefore, as long as the EAS security tag 300 is coupled to an article which is placed on the rack or in proximity to the rack, the capacitor 318 is charged. In a similar application, the EAS security tag 300 is placed inside or in close proximity to a magnetic-enabled box or cart which can be used to store and move the article while the EAS security tag 300 is being charged and/or tracked.

The RFID tags described herein can be used for various applications in addition to self-detachment applications described above. For example, by placing low-cost MFG stations throughout a desired environment (e.g., a retail store), the RFID tags are energized when coming into proximity with the MFG stations. When energized, the RFID tags function as active/semi-passive RFID tags. The active/semi-passive RFID tags have larger visibility ranges in the desired environment.

The following EXAMPLES are provided in order to further illustrate the present solution. The scope of the present solution, however, is not to be considered limited in any way thereby.

Example 1

In a retail store environment, clothing items having RFID tags attached thereto are hung on a rack equipped with an MFG station. The RFID tags remain in an active/semi-passive state while the clothing items hang from the rack. Even if the clothing items are moved away from the rack, the RFID tags maintain enough energy to remain active/semi-passive tags for an extended period of time. Hence, the RFID tags are still visible to a low-cost RFID tracking reader/system when a customer temporarily removes a clothing item from a rack.

Example 2

Low-cost MFG stations are placed in strategically-selected locations in a desired area. For example, the low-cost MFG stations are placed at the exit of a building and replace the currently used expensive/complex RFID checkpoints at the exit locations (which typically include multiple readers/antennas housed in an RFID pedestal system). This enables the use of a simple, inexpensive antenna-reader system since the energized RFID tags have much better (i.e., longer range) visibility.

Example 3

In this scenario, super-capacitors are used with the RFID tags. The super-capacitors are designed to hold energy for a desired interval of time. The interval of time includes an inventory cycle time. The inventory cycle is conducted by a mobile unit in a retail store. By the end of the inventory cycle, the mobile unit moves around the retail store. As the mobile unit moves around the retail store, it recharges the RFID tags for a next inventory cycle.

Even larger capacitors might give an opportunity to charge RFID tags in the factory so that the RFID tags are shipped to customers with sufficient charge at the end of their usability cycle. If reusable RFID tags are coupled to products that are sold before the RFID tags' charge gets too low, then the RFID tags may be recharged during a detaching process.

Example 4

For battery-assisted tags equipped with rechargeable batteries, the batteries can be charged when the tag comes into proximity with the MFG stations.

Example 5

In this example, an RFID tag is passing by a charging station producing magnetic-flux. At this time, the RFID tag receives an identifier of the charging station through near-field communication. The received identifier is then communicated from the RFID tag to an RFID reader. In this way, the exact location of the RFID tag is accurately determined since the exact location of the charging station is known.

Example 6

In this example, the RFID tag comprises a self-releasing mechanism. The self-releasing mechanism provides access to an interior of a secured area. For example, the self-releasing mechanism allows a user access to an interior of a display cabinet or an interior of a box in which jewelry or other valuables are stored. Such access can be provided when a detaching/deactivation signal is communicated from a mobile device (e.g., a smart phone running a particular application) to the RFID tag.

Figure 5A:
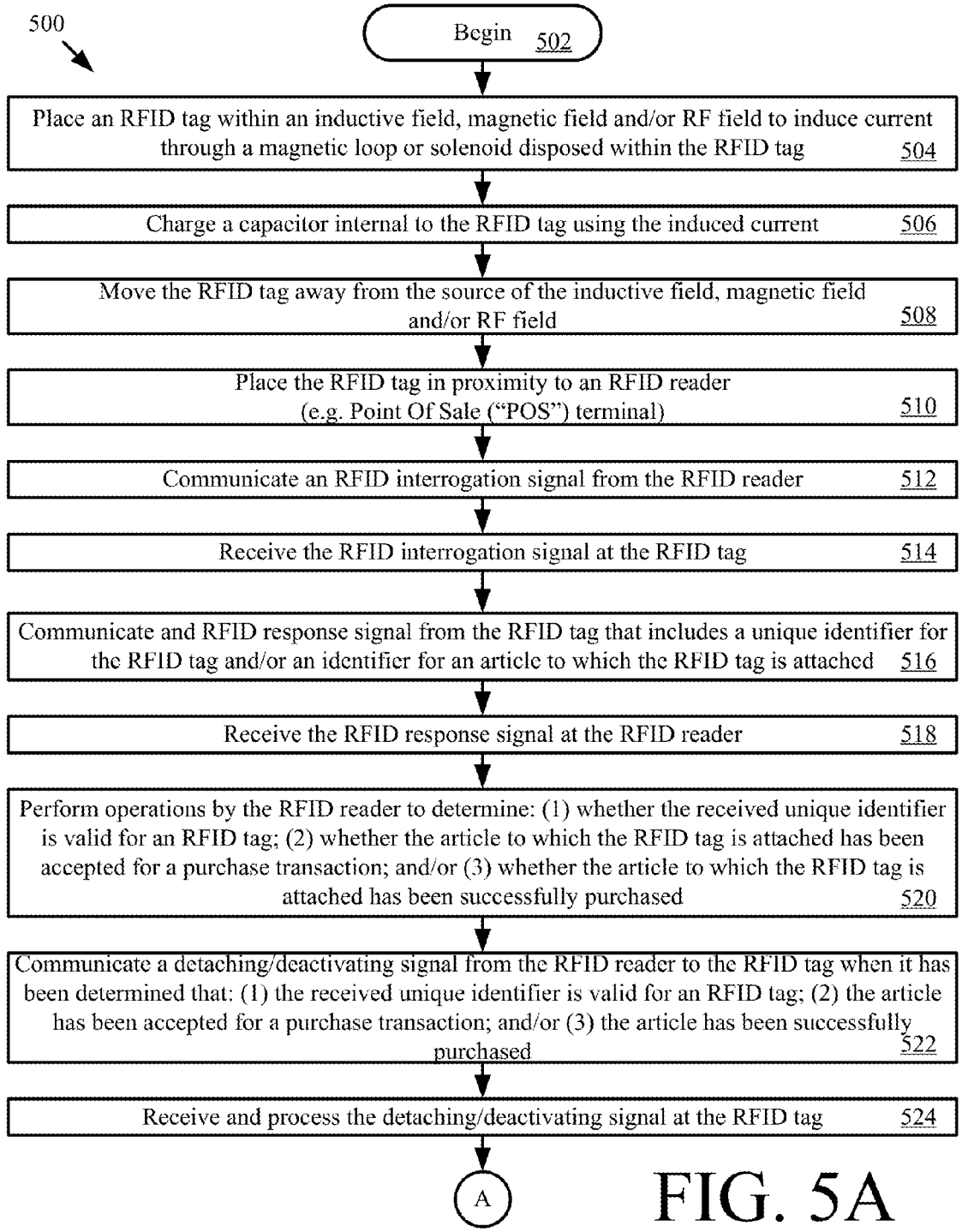
FIGS. 5A-5B (collectively referred to as "FIG. 5") provide a flow diagram of an exemplary method for operating an RFID tag.

Referring now to FIG. 5, there is provided a flow diagram of an exemplary method 500 for operating a tag (e.g., EAS security tag 108 of FIG. 1). Method 500 begins with step 502 and continues with step 504 where an RFID tag (e.g., EAS security tag 108 of FIG. 1 or 300 of FIG. 3) is placed within an inductive field, magnetic field and/or RF field to induce current through a magnetic loop (e.g., magnetic loop 316 of FIG. 3) or a solenoid disposed within the RFID tag. By placing the RFID tag in the inductive, magnetic and/or RF field(s), a capacitor (e.g., capacitor 318 of FIG. 3) internal to the RFID tag is charged in step 506 using the induced current. Next, the RFID tag is moved away from the source (e.g., MFG 122 of FIG. 1) of the inductive, magnetic and/or RF field(s) as shown by step 508.

In some scenarios, the RFID tag is placed in proximity to an RFID reader (e.g., the POS terminal 102 of FIG. 1), as shown by step 510. The RFID reader then generates and transmits an RFID interrogation signal in step 512. The RFID interrogation signal is received by the RFID tag in step 514. In response to the RFID interrogation signal, the RFID tag generates and transmits an RFID response signal. The response signal includes, but is not limited to, a unique identifier of the RFID tag and/or an identifier of the article to which the RFID tag is attached. The RFID response signal is received by the RFID reader in step 518. At the RFID reader, operations are performed in step 520 to determine: (1) whether the received unique identifier is valid for an RFID tag; (2) whether the article to which the RFID tag is attached has been accepted for a purchase transaction; and/or (3) whether the article to which the RFID tag is attached has been successfully purchased. A detaching/deactivating signal is communicated from the RFID reader to the RFID tag when it has been determined that: (1) the received unique identifier is valid for an RFID tag; (2) the article has been accepted for a purchase transaction; and/or (3) the article has been successfully purchased. The detaching/deactivation signal is then received and processed n step 524 by the RFID tag.

Figure 5B:
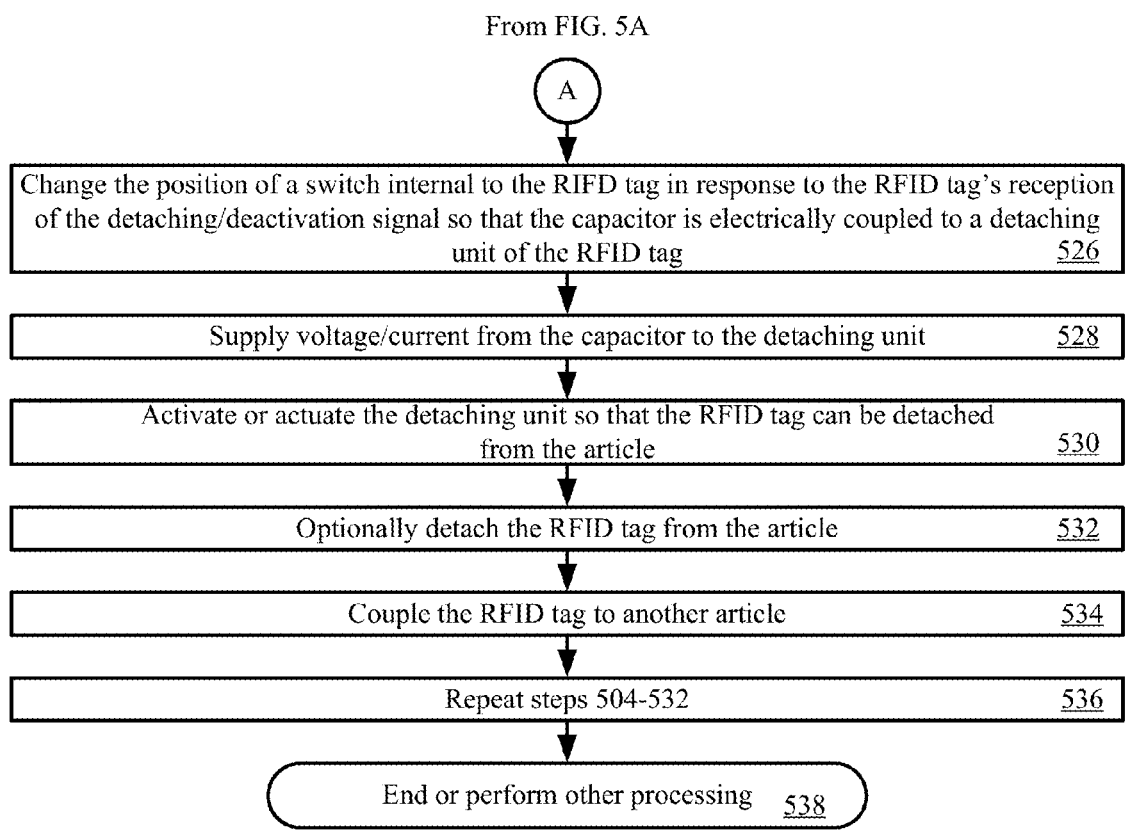

Upon completing step 524, method 500 continues with step 526 of FIG. 5B. Step 526 involves changing the position of a switch (e.g., switch 310 of FIG. 3) internal to the RFID tag in response to the RFID tag's reception of the detaching/deactivation signal so that the capacitor is electrically coupled to a detaching unit (e.g., detaching unit 312 of FIG. 3) of the RFID tag. In effect, voltage/current is supplied from the capacitor to the detaching unit. The voltage/current caused the detaching unit to be activated/actuated so that the RFID tag can be deactivated and/or detached from an article, as shown by step 530. Once the RFID tag is activated/actuated, it can be detached from the article as shown by optional step 532.

Sometime thereafter, the RFID tag is coupled to another article in step 534. In this case, steps 504-532 are repeated. Subsequently, step 538 is performed where method 500 ends or other processing is performed.

In some scenarios, it is desirable to use a relatively large capacitor to make the RFID tag a rechargeable semi-passive or active tag for the reading. This means that every few days, weeks or months the RFID tag needs to be re-charged. Once re-charged, the RFID tag is put back into the inventory knowing that it has enough charge to be easily read from a long distance. In this case, the RFID tag would not need to be detached from the article. Such a solution improves inventory processes.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for operating a Radio Frequency Identification ("RFID") tag, comprising:

selectively breaking an electrical connection between a capacitor and a detaching unit disposed within the RFID tag;
inducing current through a magnetic loop or solenoid disposed within the RFID tag that is caused by an inductive field, a magnetic field or a Radio Frequency ("RF") field being generated within a surrounding environment;
using the current which is induced through the magnetic loop or solenoid to charge the capacitor disposed within the RFID tag;
receiving a detaching signal at the RFID tag that is to cause activation of the detaching unit;
selectively re-establishing the electrical connection between the capacitor and the detaching unit in response to the detaching signal; and
activating the detaching unit by supplying current from the capacitor to the detaching unit, whereby the RFID tag can be detached from an article.

2. The method according to claim 1, wherein the amount of current induced through the magnetic loop or solenoid is decreased by moving the RFID tag a certain distance away from a source of the inductive field, magnetic field or RF field.

3. The method according to claim 1, wherein the detaching signal is generated by and communicated from a Point Of Sale ("POS") device or an RFID reader.

4. The method according to claim 1, wherein the detaching unit comprises (a) an arm that moves into a housing of the RFID tag when said current is supplied to the detaching unit and out of the housing when the current is not being supplied to the detaching unit and/or (b) a lock which is released when the current is supplied to the detaching unit.

5. The method according to claim 1, further comprising:
receiving an RFID interrogation signal at the RFID tag; and
communicating a response signal from the RFID tag in response to the RFID interrogation signal, where the response signal comprises at least one of a first identifier of the RFID tag and a second identifier for the article.

6. The method according to claim 5, wherein the detaching signal is received subsequent to when an external device determines that: (1) the first identifier is valid for the RFID tag; (2) the article to which the RFID tag is attached has been accepted for a purchase transaction; or (3) the article to which the RFID tag is attached has been successfully purchased.

7. The method according to claim 1, wherein the capacitor provides enough energy to detach or deactivate the RFID tag when no external magnetic flux is present or when a relatively weak magnetic flux is present.

8. The method according to claim 1, wherein the RFID tag comprises an Electronic Article Surveillance ("EAS") tag.

9. The method according to claim 1, wherein the magnetic loop or solenoid is imbedded within housing walls of the RFID tag.

10. A Radio Frequency Identification ("RFID") tag, comprising:

a switch;
a detaching unit;
a magnetic loop or solenoid through which a current is induced when the RFID tag is within a inductive field, a magnetic field or a Radio Frequency ("RF") field being generated within a surrounding environment;
an internal capacitor that is charged by the current which is induced through the magnetic loop or solenoid;
an antenna configured to receive a detaching signal that is to cause activation of the detaching unit disposed within the RFID tag; and
an electrical connection between the internal capacitor and the detaching unit that is (a) selectively broken at a first time and (b) selectively re-established at a second subsequent time in response to the detaching signal;
wherein the detaching unit is activated when current is supplied thereto from the internal capacitor so that the RFID tag can be detached from an article.

11. The RFID tag according to claim 10, wherein an amount of current induced through the magnetic loop or solenoid is decreased by moving the RFID tag a certain distance away from a source of the inductive field, magnetic field or RF field.

12. The RFID tag according to claim 10, wherein the detaching signal is generated by and communicated from a Point Of Sale ("POS") device or an RFID reader.

13. The RFID tag according to claim 10, wherein the detaching unit comprises (a) an arm that moves into a housing of the RFID tag when said current is supplied to the detaching unit and out of the housing when the current is not being supplied to the detaching unit and/or (b) a lock which is released when the current is supplied to the detaching unit.

14. The RFID tag according to claim 10, wherein the RFID tag is configured to:
receive an RFID interrogation signal; and
communicate a response signal therefrom in response to the RFID interrogation signal, where the response signal comprises at least one of a first identifier of the RFID tag and a second identifier for the article.

15. The RFID tag according to claim 14, wherein the detaching signal is received subsequent to when an external device determines that: (1) the first identifier is valid for the RFID tag; (2) the article to which the RFID tag is attached has been accepted for a purchase transaction; or (3) the article to which the RFID tag is attached has been successfully purchased.

16. The RFID tag according to claim 10, wherein the internal capacitor provides enough energy to detach or deactivate the RFID tag when no external magnetic flux is present or when a relatively weak magnetic flux is present.

17. The RFID tag according to claim 10, wherein the RFID tag comprises an Electronic Article Surveillance ("EAS") tag.

18. The RFID tag according to claim 10, wherein the magnetic loop or solenoid is imbedded within housing walls of the RFID tag.

* * * * *